United States Patent
Shin et al.

(10) Patent No.: US 6,806,315 B2
(45) Date of Patent: Oct. 19, 2004

(54) METHOD FOR PREPARING OF WEATHERABILITY THERMOPLASTIC RESIN

(75) Inventors: Yang-Hyun Shin, Yeocheon (KR); Keun-Hoon Yoo, Daejeon (KR); Tae-Bin Ahn, Uijeongbu (KR); Chan-Hong Lee, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 10/363,585

(22) PCT Filed: Dec. 27, 2001

(86) PCT No.: PCT/KR01/02274

§ 371 (c)(1),
(2), (4) Date: Mar. 4, 2003

(87) PCT Pub. No.: WO03/004542

PCT Pub. Date: Jan. 16, 2003

(65) Prior Publication Data

US 2003/0153710 A1 Aug. 14, 2003

(30) Foreign Application Priority Data

Jul. 4, 2001 (KR) .......................................... 2001-39820

(51) Int. Cl.⁷ .......................... C08L 13/00; C08L 51/04; C08L 25/12; C08L 33/08
(52) U.S. Cl. ........................ 525/230; 525/233; 525/234; 525/238; 525/329.1; 525/329.3; 525/308; 525/309; 524/458; 524/460; 524/555; 524/556; 524/560; 524/561; 524/562; 524/565
(58) Field of Search .................. 525/230, 233, 525/234, 238, 329.1, 329.3, 308, 309; 524/458, 460, 555, 556, 560, 562, 561, 565

(56) References Cited

U.S. PATENT DOCUMENTS 4,801,646 A * 1/1989 Henton .......................... 525/71
5,821,302 A * 10/1998 Rosenau et al. ............... 525/80

FOREIGN PATENT DOCUMENTS

| DE | 1260135 | 2/1968 |
|---|---|---|
| JP | 4-180949 | 6/1992 |
| JP | 5-202264 | 8/1993 |
| JP | 10-139833 | 5/1998 |
| JP | 11-236414 | 8/1999 |
| KR | 1999-0060688 | 7/1999 |
| KR | 2000-0000786 | 1/2000 |
| KR | 2000-0018421 | 4/2000 |
| KR | 2000-0055262 | 9/2000 |

OTHER PUBLICATIONS

PCT International Search Report; International application No. PCT/KR01/02274; International filing date Dec. 27, 2001; Apr. 3, 2002.

* cited by examiner

Primary Examiner—James J. Seidleck
Assistant Examiner—Olga Asinovsky
(74) Attorney, Agent, or Firm—Cantor Colburn LLP

(57) ABSTRACT

A method for preparing a weatherable thermoplastic resin, having superior weatherability and colorability and a weatherable thermoplastic resin prepared by the method are provided. The method includes preparing a seed by adding a water-soluble initiator to either an aromatic vinyl compound or a (meth)acrylic acid alkyl ester to obtain a first compound and performing polymerization with respect to the first compound; preparing an alkyl acrylate rubber polymer by adding an alkyl acrylate monomer, a first emulsifier of pH about 3 to about 9, and an oil-soluble initiator to the seed to obtain a second compound and performing polymerization with respect to the second compound; and preparing graft copolymer by adding the aromatic vinyl compound, a vinyl cyanide compound, a second emulsifier of pH about 9 to about 13, and the oil-soluble initiator to the alkyl acrylate rubber polymer to obtain a third compound and performing graft copolymerization with respect to the third compound.

21 Claims, No Drawings

METHOD FOR PREPARING OF WEATHERABILITY THERMOPLASTIC RESIN

BACKGROUND OF THE INVENTION (a) Field of the Invention

The present invention relates to a method for preparing thermoplastic resin having weatherability, and more particularly to a method for preparing thermoplastic acrylate-styrene-acrylonitrile (ASA) resin having excellent weatherability and color matching properties.

(b) Description of the Related Art

Recently, as the thermoplastic resin industry has advanced and the distinctiveness of goods model has gained popularity, research on giving high function of colorability etc, to materials used in the industry has progressed a great deal.

In order to increase resin functionality, the prior art has used an acrylonitrile-butadine-styrene (ABS) copolymer resin. Although ABS resin has good qualities of impact resistance, processibility, and surface gloss, etc., it has a problem in that it is unsuitable for use outdoors due to bad weatherability and light resistance because of properties of the resin, and thermal stability is also bad, chemical resistance is weak, and its properties diminish over time.

In order to solve these problems, acrylate-styrene-acrylonitrile (ASA) resin is being developed.

In a method for preparing ASA resin of the prior art, Japanese Laid-Open Patent Publication No. Hei 5-202264 has suggested a method for improving properties by preparing ASA resin with a bimodal shape. The method discloses that ASA resin with a small diameter of 50~200 nm, and ASA resin with a large diameter of 200~1000 nm each prepares, and then the two resins are latex blended together, and resultant blends with a separately prepared styrene-acrylonitrile (SAN) copolymer to produce ASA resin having superior weatherability.

However, since the method separately prepares two ASA resins the process is complex, and colorability, surface gloss, and sufficient impact strength are not exhibited. German Patent No. 1260135 has described the method in detail.

In another method, Japanese Laid-Open Patent Publication No. Hei 4-180949 discloses a method for preparing ASA resin by making multi-layer graft copolymer particles. The method suggests a preparation of ASA resin for improving weatherability in which a hard core is first prepared by using a monomer having a high glass transition temperature, then a crosslinked acrylate rubber component is added, followed by a crosslinked shell of a styrene monomer, an acrylonitrile monomer having a high glass transition temperature, and a crosslinking agent, and finally by preparing a soft shell with an uncrosslinked styrene monomer and an acrylonitrile. However, this method also does not mention a method capable of improving colorability and surface gloss of ASA resin.

As explained, although a general ASA resin has weatherability, chemical resistance, and thermal stability, it has problems of a lowering colorability and surface gloss, weak side impact strength, and its molding capacity is limited due to a low fluidity. Additionally, important technical difficulties to overcome in the preparation of ASA resin are known to be that colorability and surface gloss showing a pearl color etc. while color matching are reduced, and impact strength is low. Also, color dispersion falls due to properties of acrylate rubber.

SUMMARY OF THE INVENTION

The present invention is made in consideration of the problems of the prior art, and it is an object of the present invention to provide a method for preparing thermoplastic acrylate-styrene-acrylonitrile (ASA) resin having superior weatherability, as well as properties and colorability equal to ABS resin.

It is another object of the present invention to provide a method for preparing thermoplastic resin having superior impact resistance, chemical resistance, and surface gloss.

In order to achieve these objects, the present invention provides a method for preparing a weatherable thermoplastic resin comprising the steps of:

a) preparing a seed by adding 0.05–0.2 weight parts of a water-soluble initiator to 0.5–10 weight parts of either an aromatic vinyl compound or a (meth)acrylic acid alkyl ester, and polymerizing;

b) preparing an alkyl acrylate rubber polymer by adding
  i) 5–45 weight parts of an alkyl acrylate monomer,
  ii) 1–5 weight parts of an aromatic vinyl compound, a (meth)acrylic acid alkyl ester, or a vinyl cyanide compound,
  iii) 0.2–1.0 weight parts of a metal salt derivative of alkyl sulfosuccinate with $C_{12}$~$C_{18}$, or a metal salt derivative of alkyl sulfuric acid ester, or metal salts of sulfonate, with $C_{12}$~$C_{20}$, as an emulsifier, and
  iv) 0.05–2 weight parts of an oil-soluble initiator to the seed, and polymerizing; and c) preparing a thermoplastic resin by adding
  i) 10–40 weight parts of an aromatic vinyl compound,
  ii) 1–20 weight parts of a vinyl cyanide compound,
  iii) 0.5–3.0 weight parts of metal salts of rosinate or metal salts of carboxylate, with $C_{12}$~$C_{20}$, as an emulsifier, and
  iv) 0.05–0.2 weight parts of an oil-soluble initiator to the alkyl acrylate rubber polymer, and graft copolymerizing.

The present invention also provides a weatherable thermoplastic resin prepared by the above method.

DETAILED DESCRIPTION OF THE PREFERRED EMBODIMENTS

The present invention will now be explained in detail.

In order to solve the problem of the method for preparing weatherable resin that lowers colorability and surface gloss of acrylate-styrene-acrylonitrile (ASA) resin of the prior art, the present inventors continuously studied. As a result, the present invention was completed by introducing methylmethacrylate, by controlling contents of each component, by introducing a hard core during polyacrylate rubber polymerization, and by using a water-soluble initiator and an oil-soluble initiator differently in the polymerization steps to prepare ASA resin. The resin of the present invention comprises an acrylonitrile giving superior chemical resistance, an acrylate-based rubber giving superior impact resistance, and a styrene giving superior processability, to prepare a thermoplastic resin having superior impact resistance, chemical resistance, processability, weatherability, colorability, and surface gloss.

The method for preparing thermoplastic resin having superior weatherability of the present invention comprises the steps of a) preparation of a seed, b) preparation of a crosslinked alkyl acrylate rubber polymer, and c) preparation of a graft copolymer, and each process is explained in more detail as follows.

a) Preparation of a Seed

First, in order to produce a hard core for preparing a crosslinked alkyl acrylate rubber polymer, the present invention prevents distortion of the rubber by hardening a rubber core through seed polymerization of 0.5 to 10 weight parts of an aromatic vinyl compound monomer or a (meth)acrylic acid alkyl ester monomer having a high glass transition temperature, based on 100 weight parts of the total monomers.

Examples of preferable (meth)acrylic acid alkyl ester compounds are (meth)acrylic acid methyl ester, (meth) acrylic acid ethyl ester, (meth)acrylic acid propyl ester, (meth)acrylic acid 2-ethyl hexyl ester, (meth)acrylic acid decyl ester, and (meth)acrylic acid lauryl ester etc., and more preferable is a methyl methacrylate such as (meth)acrylic acid methyl ester.

The aromatic vinyl compound used is a styrene monomer derivative. Preferable examples are selected from the group consisting of styrene, α-methyl styrene, and vinyl toluene, and particularly preferable is styrene.

According to the present invention, in the case of initial seed polymerization, a water-soluble initiator is used; and in the case of polymerization in second and third steps, an oil-soluble initiator is used, and thus colorability and surface gloss can be improved by increasing graft efficiency of the reactant. The initiator used in the present invention is an inorganic or an organic peroxide. In the case of seed polymerization, the water-soluble initiator is used to improve colorability, and the oil-soluble initiator is used in the graft and rubber particle growth reaction. As examples, the water-soluble initiator is preferably selected from the group consisting of potassium persulfate, sodium persulfate, and ammonium persulfate, while the oil-soluble initiator is preferably cumene hydroperoxide, t-butyl hydroperoxide, or benzoyl peroxide.

The content of the water-soluble initiator is preferably 0.05 to 0.2 weight parts based on 100 weight parts of total monomers.

The crosslinking agent used in the present invention is selected from the group consisting of ethyleneglycol dimethacrylate, diethyleneglycol dimethacrylate, triethyleneglycol dimethacrylate, 1,3-buthanediol dimethacrylate, 1,6-hexanediol dimethacrylate, neopentylglycol dimethacrylate, trimethylol propane trimethacrylate, and trimethylol methane triarylate. The content is 0.05 to 0.3 weight parts based on 100 weight parts of total monomers.

An electrolyte used in the present invention is selected from the group consisting of $NaHCO_3$, $Na_2S_2O_7$, $K_2CO_3$, and preferable is $NaHCO_3$. The content of electrolyte is 0.05 to 0.4 weight parts based on 100 weight parts of total monomers.

b) Preparation of Crosslinked Alkyl Acrylate Rubber Polymer

The present invention performs the step of preparing a crosslinked alkyl acrylate rubber polymer by adding an alkyl acrylate monomer; an aromatic vinyl compound, a (meth) acrylic acid alkyl ester, or a vinyl cyanide compound; a metal salt derivative of alkyl sulfosuccinate with $C_{12}$~$C_{18}$, or a metal salt derivative of alkyl sulfuric acid ester or metal salts of sulfonate with $C_{12}$~$C_{20}$, as an emulsifier; and the oil-soluble initiator, to the seed prepared in the a) step.

In the present invention, an alky acrylate monomer (preferably butyl acrylate) as a major monomer is used, and the content thereof is 5 to 45 weight parts based on 100 weight parts of total monomers.

Additionally, the present invention preferably uses 0.1 to 15 weight parts of an optimized mixture ratio of methyl methacrylate, styrene, and acrylonitrile as a supplement to improve efficiency of the rubber particles and the pearl color, and it is also possible to copolymerize a functional monomer. The functional monomer is selected from the group consisting of methacrylic acid, acrylic acid, maleic acid, itaconic acid, and fumalic acid.

An aqueous solution of the emulsifier preferably has pH of 3~9, and for example the emulsifier used is a metal salt derivative of alkyl sulfosuccinate with $C_{12}$~$C_{18}$, or a derivative of alkyl sulfuric acid ester or metal salts of sulfonate with $C_{12}$~$C_{20}$. The metal salt derivative of alkyl sulfosuccinate with $C_{12}$~$C_{16}$ is a sodium or potassium salt etc. of dioctyl sulfosuccinate, dicyclohexyl sulfonate, or dihexyl sulfosuccinate; and the derivative of alkyl sulfonic ester with $C_{12}$~$C_{20}$ or metal salts of sulfonate can be used as alkyl sulfate metal salts such as sodium lauric sulfate, sodium dodecyl sulfate, sodium dodecyl benzene sulfate, sodium octadecyl sulfate, sodium oleic sulfate, potassium dodecyl sulfate, potassium octadecyl sulfate, etc. Among them, in overall consideration of the graft reaction of the graft phase for foam occurrence and the drying property of the crosslinked butyl acrylate rubber polymer, sodium dioctyl sulfosuccinate or potassium dioctyl sulfosuccinate is preferable. The content of emulsifier used is 0.2 to 1.0 weight parts based on 100 weight parts of total monomers.

If a carboxylate metal salt derivative such as a metal salt of aliphatic acid or a metal salt of rosiniate etc. where an aqueous solution of the emulsifier has pH of about 9~13 is used, although drying can be enhanced, it is difficult to graft methacrylic acid methyl in the butyl acrylate rubber polymer into ASA resin due to a lower moisture content, and thus stripping occurs because of phase separation resulting in a substantial decrease in impact strength.

The oil-soluble initiator used in the present invention is cumene hydroperoxide, t-butyl hydroperoxide, or benzoyl peroxide. The content is 0.05 to 0.2 weight parts based on 100 weight parts of total monomers.

Also, according to the preparation of the acrylate rubber polymer of the present invention, the b) step can further comprise a grafting agent selected from the group consisting of v) aryl methacrylate (AMA), triarylisocyanurate (TAIC), triarylamine (TAA), and diarylamine (DAA), wherein the content is 0.01 to 0.07 weight parts based on 100 weight parts of total monomers.

The crosslinking agent used in the present invention is selected from the group consisting of ethyleneglylcol dimethacrylate, diethyleneglycol dimethacrylate, triethyleneglycol dimethacrylate, 1,3-buthanediol dimethacrylate, 1,6-hexanediol dimethacrylate, neopentylglycol dimethacrylate, trimethylol propane trimethacrylate, and trimethylol methane triarylate. The content is 0.05 to 0.3 weight parts based on 100 weight parts of total monomers.

The electrolyte used in the present invention is selected from the group consisting of $NaHCO_2$, $Na_2S_2O_7$, and $K_2CO_3$, and $NaHCO_3$ is preferable. The content of electrolyte is 0.05 to 0.4 weight parts based on 100 weight parts of total monomers.

The reaction can be performed only through emulsion polymerization, or it can be preformed by suitably mixing emulsifier-free emulsion polymerization and emulsion polymerization to prepare acryl rubber polymer latex. The monomers can be added continuously, or by adding continuously and in batches.

The aqueous solution of the crosslinked alkyl acrylate rubber polymer latex after polymerization of the present invention preferably has pH of 5 to 9, and more preferably 6 to 8. The rubber polymer preferably has a diameter of 2500~5000 Å, and more preferably 3000~4500 Å.

c) Preparation of Graft Copolymer

The present invention can have improved impact strength and it can maintain colorability of ASA resin better when compared to the prior art through the graft reaction by adding an aromatic vinyl compound, a vinyl cyanide compound, metal salts of rosinate or metal salts of carboxylate with $C_{12}$~$C_{20}$ as an emulsifier, and an oil-soluble initiator to the acylate rubber polymer prepared in the b) step.

The monomer grafted in the crosslinked alkyl acrylate rubber polymer uses 10 to 40 weight parts of the aromatic vinyl compound and 1 to 20 weight parts of the vinyl cyanide compound, and a functional monomer is further used according to necessity.

The aromatic vinyl compound used is a styrene monomer derivative. As an example, it is selected from the group consisting of styrene, α-methyl styrene, and p-methyl styrene, and preferable is styrene. The vinyl cyanide used is acrylonitrile or methacrylonitrile, and preferable is acrylonitrile. The functional monomer possibly used can be methacrylic acid, acrylic acid, maleic acid, itaconic acid, furmalic acid, etc.

The aqueous solution of the emulsifier preferably has pH of 9~13, and as an example the emulsifier is preferably a metal salt derivative of carboxylate such as a metal salt derivative of aliphatic acid with $C_{12}$~$C_{20}$, a metal salt of rosinate, etc. The metal salt derivative of aliphatic acid is a sodium or potassium salt of a fatty acid, lauric acid, or oleic acid, and the metal salt of rosinate is sodium rosinate or potassium rosinate.

If a metal salt derivative of carboxylate such as a metal salt of aliphatic acid with $C_{12}$~$C_2$ or a metal salt of rosinate etc. where the aqueous solution emulsifier has a pH of about 9~13 is used, as the pH of the total system rises little by little, a carboxyl group of butyl acrylate rubber polymer having a low glass transition temperature comes out of the particle. But as polymerization progresses, a graft phase having a high glass transition temperature comes to the inner part of the butyl acrylate rubber polymer particle, and thus a surface glass transition temperature can be lowered and thereby it can be coagulated at normal pressure, and additionally, drying also becomes easier because the moisture content inside the ASA particle is remarkably decreased.

In the case a graft reaction initiator is used as explained, an oil-soluble initiator such as cumene hydroperoxide, t-butyl hydroperoxide, or benzoyl peroxide is used, and the content is preferably 0.05 to 0.3 weight parts based on 100 weight pars of total monomers.

In the case of the grafting reaction, the mixing monomer comprising an emulsifier is preferably continuously added. With the batch adding method, since pH of the polymerization system rises at the same time, it is difficult to graft and the inner structure is not uniform due to inferior particle stability.

The final latex aqueous solution prepared by the method preferably has pH of 8~11, and more preferably 9~10.5.

Additionally, a diameter of the rubber polymer latex is preferably 3000~6000 Å, and more preferably 3500~4500 Å.

As above, according to the present invention, a weatherable thermoplastic resin which has superior impact resistance, chemical resistance, processability etc., and improved colorability and surface gloss can be obtained by controlling an amounts of the monomer components such as a (meth)acrylic acid alkyl ester compound, an aromatic vinyl compound, a vinyl cyanide compound etc. added in a polyacrylate-based rubber latex, and particularly by graft polymerizing them together with a water-soluble initiator and an oil-soluble initiator.

The present invention will be explained in more detail with reference to the following Examples. However, these are to illustrate the present invention, and the present invention is not limited to them.

Example 1

| First polymerization step | |
|---|---|
| ion exchange water | 70 wt parts |
| styrene (SM) | 2 wt parts |
| ethyleneglycol dimethacrylate (EDMA) | 0.02 wt parts |
| sodium bicarbonate | 0.1 wt parts |
| potassium persulfate (KPS) | 0.01 wt parts |
| The components were introduced into a polymerization reactor under a nitrogen atmosphere, and the temperature was elevated to 70° C. and they were reacted for 1 hour. | |
| Second polymerization step | |
| exchange water | 45 wt parts |
| dioctylsulfosuccinato | 0.5 wt parts |
| Butylacrylate | 40 wt parts |
| styrene (SM) | 3 wt parts |
| methylmethacrylate (MMA) | 2 wt parts |
| ethyleneglycol dimethacrylate (EDMA) | 0.12 wt parts |
| arylmethacrylate | 0.04 wt parts |
| sodium bicarbonate | 0.1 wt parts |
| cumene hydroperoxide (CHP) | 0.06 wt parts |

All the above components except cumene hydroperoxide were mixed in a polymerization reactor, and then the obtained mixture and a catalyst were each continuously introduced to the product of the first polymerization step at 70° C. over 4 hours to conduct the polymerization reaction. The diameter of the obtained latex was 4000 Å, the pH thereof was 8, and a polymerization conversion rate was 98%. The diameter of the latex was measured by the dynamic laser-light scattering method using a Nicomp analyzer (Model: 370HPL).

| Third polymerization step | |
|---|---|
| ion exchange water | 63 weight parts |
| potassium rosinate | 0.5 weight parts |
| styrene(SM) | 38 weight parts |
| acrylonitrile(AN) | 15 weight parts |
| cumene hydroperoxide(CHP) | 0.11 weight parts |

All the above components except cumene hydroperoxide were mixed in a polymerization reactor, and then the obtained mixture and a catalyst were each continuously introduced to the product of the second polymerization step at 70° C. over 4 hours to conduct a polymerization reaction. Thereafter, in order to improve the polymerization conversion rate, the resultant was further reacted at 80° C. for 1 hour, and it was then cooled to 60° C. The diameter of the obtained latex was 4800 Å, the pH thereof was 9.5, the polymerization conversion rate was 99%, and the graft rate was 45%.

The obtained latex was coagulated at 85° C., normal pressure with a calcium chloride aqueous solution, then aged at 95° C., then dehydrated and washed, and finally dried by hot blast at 90° C. for 30 min. to obtain ASA powder particles having weatherability.

To the ASA powder particles having weatherability obtained by the method, a SAN (81 HF) copolymer resin (LG CHEM. Ltd. product) was introduced as an antioxidant and a photostabilizer, and the whole was kneaded and extruded at 200 to 250° C. to prepare a pellet having a rubber content of 20%. The pellet was injection molded again and the properties were measured, and the results are shown in Table 1.

The properties were measured by the ASTM method, and measurement conditions of each property were as follows.

Izod impact strength: ASTM D256 (¼" notched at 25° C., unit Kg·cm/cm) colorability: decision made with the naked eye surface gloss: ASTM D528 (45° angle)

EXAMPLE 2

ASA resin was prepared by the same method as in Example 1 except that the amount of styrene used in the first polymerization step was increased to 5 wt parts, and the amount of styrene used in the third polymerization step was reduced to 35 wt parts. The properties were measured by the same method as In Example 1, and the results are shown in Table 1.

EXAMPLE 3

ASA resin was prepared by the same method as in Example 1, except that TBHP (t-butyl hydroperoxide was used instead of cumene hydroperoxide as the initiator in the second polymerization step. The properties were measured by the same method as in Example 1, and the results are shown in Table 1.

EXAMPLE 4

ASA resin was prepared by the same method as in Example 1, except that methylmethacrylate was used instead of the styrene monomer in the first polymerization step. The properties were measured by the same method as in Example 1, and the results are shown in Table 1.

EXAMPLE 5

ASA resin was prepared by the same method as in Example 1, except that acrylonitrile was used instead of the styrene monomer in the second polymerization step. The properties were measured by the same method as in Example 1, and the results are shown in Table 1.

COMPARATIVE EXAMPLE 1

ASA resin was prepared by the same method as in Example 1, except that methylmethacrylate and the styrene monomer were not added in the second polymerization step, and the amounts thereof were added in the third step polymerization. The properties were measured by the same method as in Example 1, and the results are shown in Table 1.

COMPARATIVE EXAMPLE 2

ASA resin was prepared by the same method as in Example 1, except that potassium persulfate (KPS) as a water-soluble initiator was used instead of cumene hydroperoxide (CHP) in the second and third polymerization steps. The properties were measured by the same method as in Example 1, and the results are shown in Table 1.

TABLE 1

|  | Example 1 | Example 2 | Example 3 | Example 4 | Example 5 | Com. Exam. 1 | Com. Exam. 2 |
|---|---|---|---|---|---|---|---|
| Impact strength (Kg · cm/cm) | 20 | 16 | 19 | 20 | 18 | 12 | 10 |
| Surface gloss (45°) | 99 | 101 | 95 | 93 | 95 | 80 | 75 |
| Colorability | good | good | good | good | good | Bad | Very bad |

As shown in Table 1, Examples 1 to 5 using both a water-soluble initiator and an oil-soluble initiator of the present invention had excellent impact strength at 16~20 Kg·cm/cm, and surface gloss and colorability were very excellent. On the other hand, Comparative Examples 1 and 2 used only a water-soluble initiator, and the thus-produced ASA resin had a very low impact strength, and colorability was extremely bad.

As explained, the method of preparing a thermoplastic resin of the present invention results in a resin with superior impact resistance, chemical resistance, and processability, etc., and particularly a thermoplastic resin with good weatherability and having improved colorability and surface gloss can be obtained.

What is claimed is:

1. A method for preparing a weatherable thermoplastic resin, comprising:
   preparing a seed, including:
      adding about 0.05 weight parts to about 0.2 weight parts of a water-soluble initiator to about 0.5 weight parts to about 10 weight parts of either an aromatic vinyl compound or a (methacrylic acid alkyl ester, to obtain a first compound; and
      performing polymerization with respect to the first compound;
   preparing an alkyl acrylate rubber polymer, including:
      adding about 5 weight parts to about 45 weight parts of an alkyl acrylate monomer; about 1 weight part to about 5 weight parts of the aromatic vinyl compound, acrylic acid an alkyl methacrylate, or a vinyl cyanide compound; about 0.2 weight parts to about 1.0 weight pant of a metal salt derivative of alkyl sulfosuccinate with $C_{12}$~$C_{18}$, an alkyl sulfuric acid ester with $C_{12}$~$C_{20}$, or a metal sulfonate, as a first emulsifier; and about 0.05 weight parts to about 0.2 weight parts of an oil-soluble initiator, to the seed, to obtain a second compound; and performing polymerization with respect to the second compound; and preparing a graft copolymer, including:
adding about 10 weight parts to about 40 weight parts of the aromatic vinyl compound; about 1 weight part to about 20 weight parts of the vinyl cyanide compound;

about 0.5 weight parts to about 3.0 weight parts of a metal salt of rosinate or a metal salt of carboxylate, with $C_{12}$~$C_{20}$, as a second emulsifier; and about 0.05 weight parts to about 0.2 weight parts of the oil-soluble initiator, to be alkyl acrylate rubber polymer, to obtain a third compound; and performing graft copolymerization with respect to the third compound.

2. The method for preparing a weatherable thermoplastic resin according to claim 1, wherein the alkyl acrylate rubber polymer has a diameter of about 2500 Å to about 5000 Å, and wherein a polymer aqueous solution of to alkyl acrylate rubber polymer has pH of about 5 to about 9.

3. The method for preparing a weatherable thermoplastic resin according to claim 1, wherein an aqueous solution of the first emulsifier has pH of about 3 to about 9, and wherein an aqueous solution of the second emulsifier has pH of about 9 to about 13.

4. The method for preparing a weatherable thermoplastic resin according to claim 1, wherein the water-soluble initiator is selected from the group consisting of potassium persulfate, sodium persulfate, and ammonium persulfate.

5. The method for preparing a weatherable thermoplastic resin according to claim 1, wherein the oil-soluble initiator comprises cumene hydroperoxide, t-butyl hydroperoxide, or benzoyl peroxide.

6. The method for preparing a weatherable thermoplastic resin according to claim 1, wherein the alkyl acrylate monomer is selected from the group consisting of butyl acrylate, ethyl acrylate, and methyl acrylate.

7. The method for preparing a weatherable thermoplastic resin according to claim 1, wherein the aromatic vinyl compound is selected from the group consisting of styrene, α-methyl styrene, and vinyl toluene.

8. The method for preparing a weatherable thermoplastic resin according to claim 1, wherein the vinyl cyanide compound comprises acrylonitrile or methacrylonitrile.

9. The method for preparing a weatherable thermoplastic resin according to claim 1, wherein the acid alkyl methacrylate is selected from the group consisting of acid methyl methacrylate, acrylic ethyl methacrylate, acrylic propyl estermethacrylate, 2-ethyl hexyl methacrylate, acrylic decyl estermethacrylate, and acid-lauryl methacrylate.

10. The method for preparing a weatherable thermoplastic resin according to claim 1, wherein the second compound further comprises about 0.01 weight part to about 0.07 weight parts of a grafting agent selected from the group consisting of aryl methacrylate (AMA), triarylisocyonurate (TAIC), triarylamine (TAA), and diarylamine (DAA).

11. The method for preparing a weatherable thermoplastic resin according to claim 1, wherein each of the first and second compounds further comprises a crosslinking agent selected from the group consisting or ethyleneglycol dimethacrylate, diethyleneglycol dimethacrylate, triethyleneglycol dimethacrylate, 1,3-buthanediol dimethacrylate, 1,6-hexanediol dimethacrylate, neopentylglycol dimethacrylate, trimethylol propane trimethacrylate, and trimethylol methane triarylate.

12. A weatherable thermoplastic resin prepared by a method comprising:
preparing a seed, including:
adding about 0.05 weight parts to about 0.2 weight parts of a water-soluble initiator to about 0.5 weight parts to about 10 weight parts of either an aromatic vinyl compound or a (meth)acrylic acid alkyl ester, to obtain a first compound; and
performing polymerization with respect to the first compound;

preparing an alkyl acrylate rubber polymer, including:
adding about 5 weight parts to about 45 weight parts of an alkyl acrylate monomer; about 1 weight part to about 5 weight parts of the aromatic vinyl compound, (meth)alkyl methacrylate, or a vinyl cyanide compound; about 0.2 weight parts to about 1.0 weight part of a metal salt derivative of alkyl sulfosuccinate with $C_{12}$~$C_{18}$, an alkyl sulfuric acid ester with $C_{12}$~$C_{20}$, or a metal sulfonate, as a first emulsifier; and about 0.05 weight parts to about 0.2 weight parts of an oil-soluble initiator, to the seed, to obtain a second compound; and performing polymerization with respect to the second compound; and preparing a graft copolymer, including:
adding about 10 weight parts to about 40 weight parts of the aromatic vinyl compound; about 1 weight part to about 20 weight parts of the vinyl cyanide compound; about 0.5 weight parts to about 3.0 weight parts of a metal salt of rosinate or a metal salt of carboxylate, with $C_{12}$~$C_{20}$, as a second emulsifier; and about 0.05 weight parts to about 0.2 weight parts of the oil-soluble initiator, to the alkyl acrylate rubber polymer, to obtain a third compound; and performing graft copolymerization with respect to the third compound.

13. The weatherable thermoplastic resin according to claim 12, wherein the resin has an impact strength of about 16 kg·cm/cm to about 20 kg·cm/cm.

14. The weatherable thermoplastic resin according to claim 13, wherein the weatherable thermoplastic resin is a thermoplastic acrylate-styrene-acrylonitrile (ASA) resin.

15. The method for preparing a weatherable thermoplastic resin according to claim 1, wherein the graft copolymer has a particle size of about 3000 Å to about 6000 Å, and wherein an aqueous solution of the graft copolymer has pH of about 8 to about 11.

16. A method for preparing a weatherable thermoplastic resin, comprising:
performing a first polymerization with respect to a first mixture or about 0.05 weight parts to about 0.2 weight parts of a water-soluble initiator and about 0.5 weight parts to about 10 weight parts of either an aromatic vinyl compound or a (meth)acrylic acid alkyl ester, to prepare a seed;

performing a second polymerization with respect to a second mixture of about 5 weight parts to about 45 weight parts of an alkyl acrylate monomer; about 1 weight part to about 5 weight parts of the aromatic vinyl compound, an alkyl methacrylate, or a vinyl cyanide compound; about 0.2 weight parts to about 1.0 weight part of a first emulsifier, about 0.05 weight parts to about 0.2 weight parts of an oil-soluble initiator; and the seed, to prepare an alkyl acrylate rubber polymer; and performing graft copolymerization with respect to a third mixture of about 10 weight parts to about 40 weight parts of the aromatic vinyl compound; about 1 weight part to about 20 weight parts of the vinyl cyanide compound; about 0.5 weight parts to about 3.0 weight parts of a second emulsifier; about 0.05 weight parts to about 0.2 weight parts of the oil-soluble initiator; and the alkyl acrylate rubber polymer, to prepare a graft copolymer.

17. The method according to claim 16, wherein the first emulsifier comprises a metal salt derivative of alkyl sulfosuccinate with $C_{12}$~$C_{18}$, an alkyl sulfuric acid ester with $C_{12}$~$C_{20}$, or a metal sulfonate, and wherein the second emulsifier comprises a metal salt of rosinate or a metal salt of carboxylate, with $C_{12}$~$C_{20}$.

18. The method according to claim 16, wherein an aqueous solution of the first emulsifier has pH of about 3 to about 9, and wherein an aqueous solution of the second emulsifier has pH of about 9 to about 13.

19. The method according to claim 16, wherein the water-soluble initiator comprises potassium persulfate, sodium persulfate, or ammonium persulfate, and wherein the oil-soluble initiator comprises cumene hydroperoxide, t-butyl hydroperoxide, or benzoyl peroxide.

20. The method according to claim 16, wherein each of the first and second mixtures further comprises a crosslinking agent selected from the group consisting of ethyleneglylcol dimethacrylate, diethyleneglycol dimethacrylate, triethyleneglycol dimethacrylate, 1,3-buthanediol dimethacrylate, 1,6-hexanediol dimethacrylate, neopentylglycol dimethacrylate, trimethylol propane trimethacrylate, and trimethylol methane triarylate.

21. The weatherable thermoplastic resin according to claim 12, wherein each of the first and second mixtures further comprises a crosslinking agent selected from the group consisting of ethyleneglylcol dimethacrylate, diethyleneglycol dimethacrylate, triethyleneglycol dimethacrylate, 1,3-buthanediol dimethacrylate, 1,6-hexanediol dimethacrylate, neopentylglycol dimethacrylate, trimethylol propane trimethacrylate, and trimethylol methane triarylate.

* * * * *